Sept. 21, 1926.
W. F. ROCKWELL
WORM DRIVE
Filed June 16, 1924
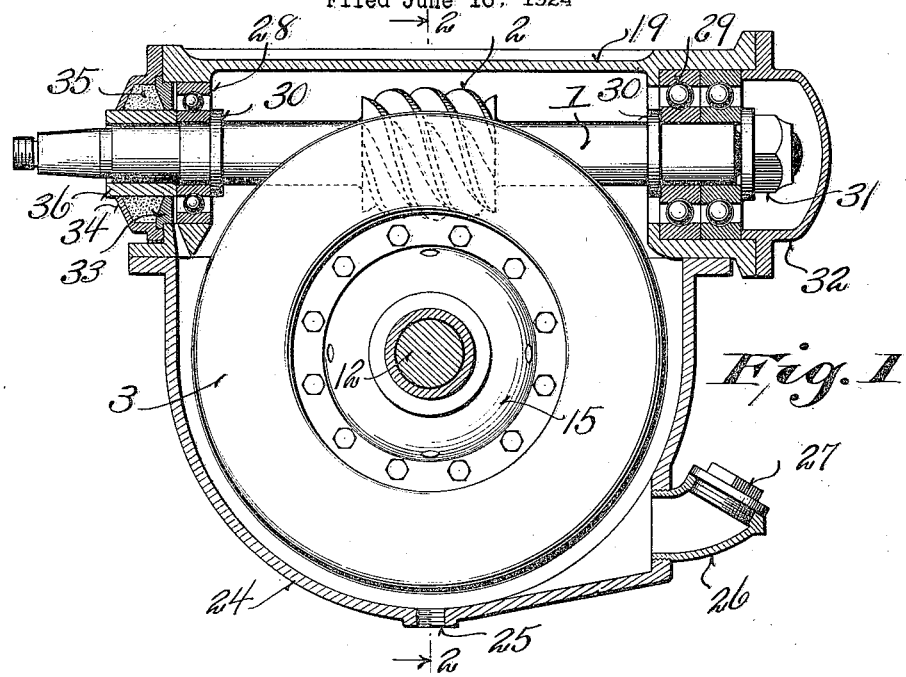
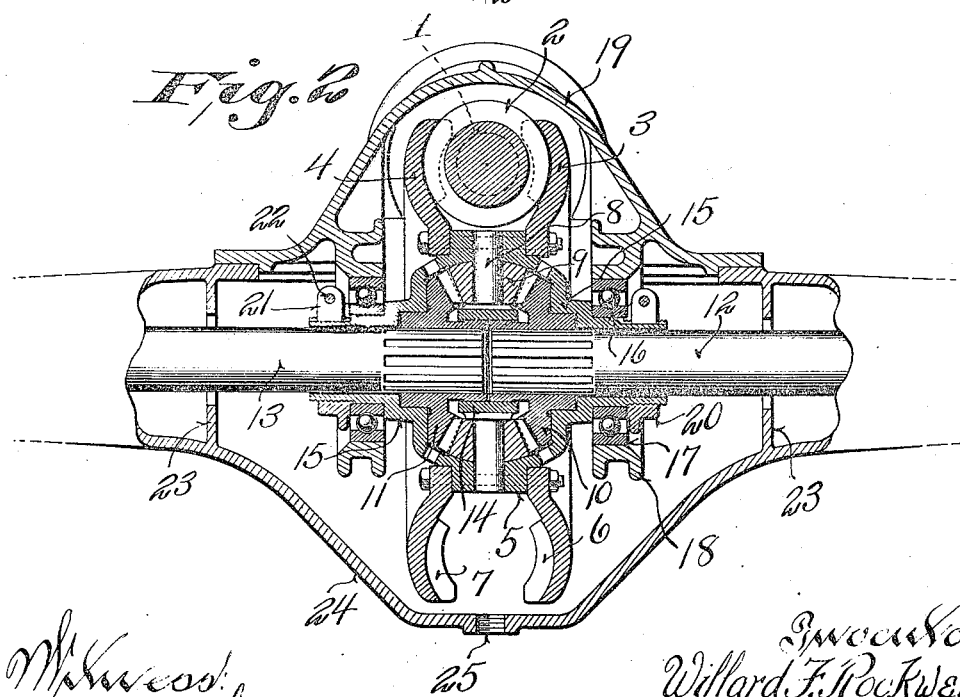

Patented Sept. 21, 1926.

1,600,738

UNITED STATES PATENT OFFICE.

WILLARD F. ROCKWELL, OF OSHKOSH, WISCONSIN.

WORM DRIVE.

Application filed June 16, 1924. Serial No. 720,396.

This invention relates to a worm drive, and is particularly directed to a worm drive for automobile axles.

Objects of this invention are to provide a worm drive in which there is no external separating force between the worm and the worm wheel, but in which the forces are balanced against each other within the worm wheel itself, so that there is, as stated, no tendency to press the worm outwardly from the worm wheel.

Further objects are to provide a novel form of worm drive which insures a large surface contact between the worm and the worm wheel, and which is so constructed that it may be readily produced in a simple and cheap manner.

An embodiment of the invention is shown in the accompanying drawings, in which:—

Figure 1 is a side elevation of the worm and worm wheel with a portion of the casing in section.

Figure 2 is a vertical sectional view on the line 2—2 of Figure 1.

The worm shaft 1 is provided with a worm 2 which is preferably integral therewith so as to attain maximum strength although obviously the invention may be embodied in a separate worm attached to the shaft. This worm, it will be noted, is neither of the straight cylindrical type, nor is it of the hour-glass type, but it will be noted from reference to Figure 1, that the worm 2 has its maximum diameter at its central portion and, thereafter, rounds or tapers inwardly as its outer ends are approached.

The worm wheel consists of two distinct members 3 and 4 which are annular members adapted to be bolted rigidly to a connecting ring 5, as shown in Figure 2. These worm wheel members 3 and 4 are provided with inwardly projecting curved teeth 6 and 7 which engage the worm on diametrically opposed sides presenting on each side of the worm substantially the same actual area of surface contact.

The separate forces acting between the worm and worm wheel will be balanced in this construction as they act in opposition to each other, and as the members 3 and 4 are rigidly joined as a unit in the assembled construction no external separate force will manifest itself as existing between the worm and worm wheel.

Further, it is to be noted that this construction provides a very large area of contact between the worm and worm wheel, and thus reduces the pressure per unit area for the same power transmission as compared with a conventional type of worm and worm wheel. It is also to be noted that although there is a slight overhang at the outer or peripheral portion of the worm wheel elements that, nevertheless, this does not produce any binding action for the reason that the worm is tapered towards its ends thus clearing the overhang.

The ring 5 is provided with a plurality of inwardly projecting pins 8 which carry pinions 9, such pinions meshing with a pair of bevel gears 10 and 11. These bevel gears are rigidly splined to the rear axles 12 and 13 respectively, in the usual manner. If desired, a sleeve 14 may surround the inner or juxtaposed hubs of the bevel gears 10 and 11 to insure correct relative positioning of these gears irrespective of the wear of the bearings.

It is to be noted that the ring 5 has integral outwardly projecting shouldered continuations 15 which fit loosely against the bevel gears 10 and 11. These members are also provided with external shoulders which fit tightly against the inner rings 16 of ball bearings, the outer ring 17 thereof being carried in apertured supporting lugs 18 extending downwardly and carried by the detachable upper portion 19 of the rear axle housing. Split nuts 20 are threaded upon extensions of the members 15, as shown in Figure 2, and, if desired, a flat metal key 21 may be interposed between the split faces of these nuts and held in position by the clamping bolts 22 thereof. These keys 21 fit in correspondingly formed slots in the members 15 and prevent rotation of the nuts after they have been once positioned against the rings 16 of the ball bearings.

The rear axle housing, it will be noted, is provided with inwardly directed walls 23 through which the axles 12 and 13 pass. These walls serve to retain the lubricant carried within the casing 24 for the worm wheel, such casing being integral with the rear axle housings. The casing 24 is provided with a drain plug aperture 25 and a laterally opening aperture within which a curved filling nipple 26 is screwed, such nipple being provided with a plug 27, as shown in Figure 1.

The worm shaft 1 is carried in ball bearings 28 and 29 positioned against the collars 30 formed on the worm shaft. The rear end of the worm shaft may be provided with a threaded extension upon which a nut 31 is screwed, thus retaining the bearings in position. It is also to be noted that a seperate cap 32 is provided for the rear end of the casing portion 19, such cap being bolted in position in any suitable manner. The forward end of the casing 19 is provided with a tapered ring 33 and with an inwardly tapered cap 34 between which packing 35 is adapted to be compressed, it being understood, of course, that the cap 34 is held in position by bolts in any suitable manner. This packing is adapted to bear either against the worm shaft 1 or against a sleeve 36 carried thereby, to prevent the outward flow of the lubricant when such lubricant is carried upwardly adjacent these parts.

It will be seen that a novel form of worm drive has been provided in which separating forces between the worm and worm wheel are wholly avoided, and in which a very large area of active contact between the worm and worm wheel is secured. This construction also makes for silent operation and for a smooth running unit.

It will be seen that a worm drive has been provided which is particularly applicable to automobile installation. By this construction, it is possible to transmit a relatively large amount of power through a worm wheel mechanism of relatively small outside dimensions. As it is appreciated, this is eminently suited for buss, automobile, and truck installation.

Although the invention has been described in considerable detail, it is to be understood that the invention may be variously embodied and is, therefore, to be limited only as claimed.

It is understod that this double worm drive mechanism is particularly adapted to use in connection with what is known to trade as a under slug worm type.

I claim:

A worm drive for automobiles having a pair of opposed shafts, a ring having outwardly extending hubs surrounding said shafts, mechanism operatively connecting said ring and said shafts, a worm positioned exteriorly of said ring and having tapered ends, a pair of annular spaced plates having teeth formed integrally therewith and engaging said worm on diametrically opposite sides, said plates having inner portions contacting with opposite sides of said ring, and bolts extending completely through the inner portions of said plates and through said ring.

In testimony that I claim the foregoing I have hereunto set my hand at Oshkosh, in the county of Winnebago and State of Wisconsin.

WILLARD F. ROCKWELL.